Patented Jan. 13, 1953

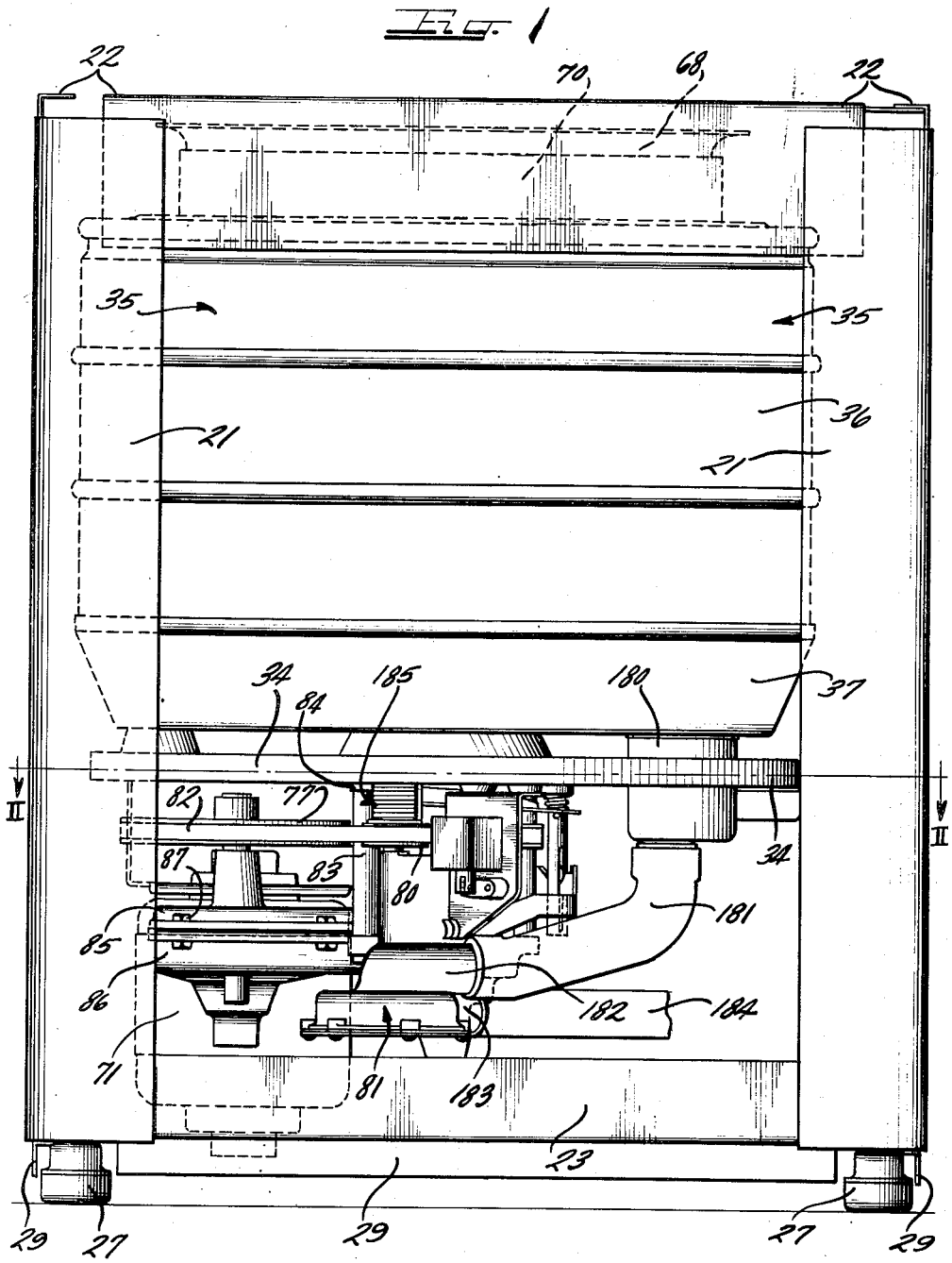

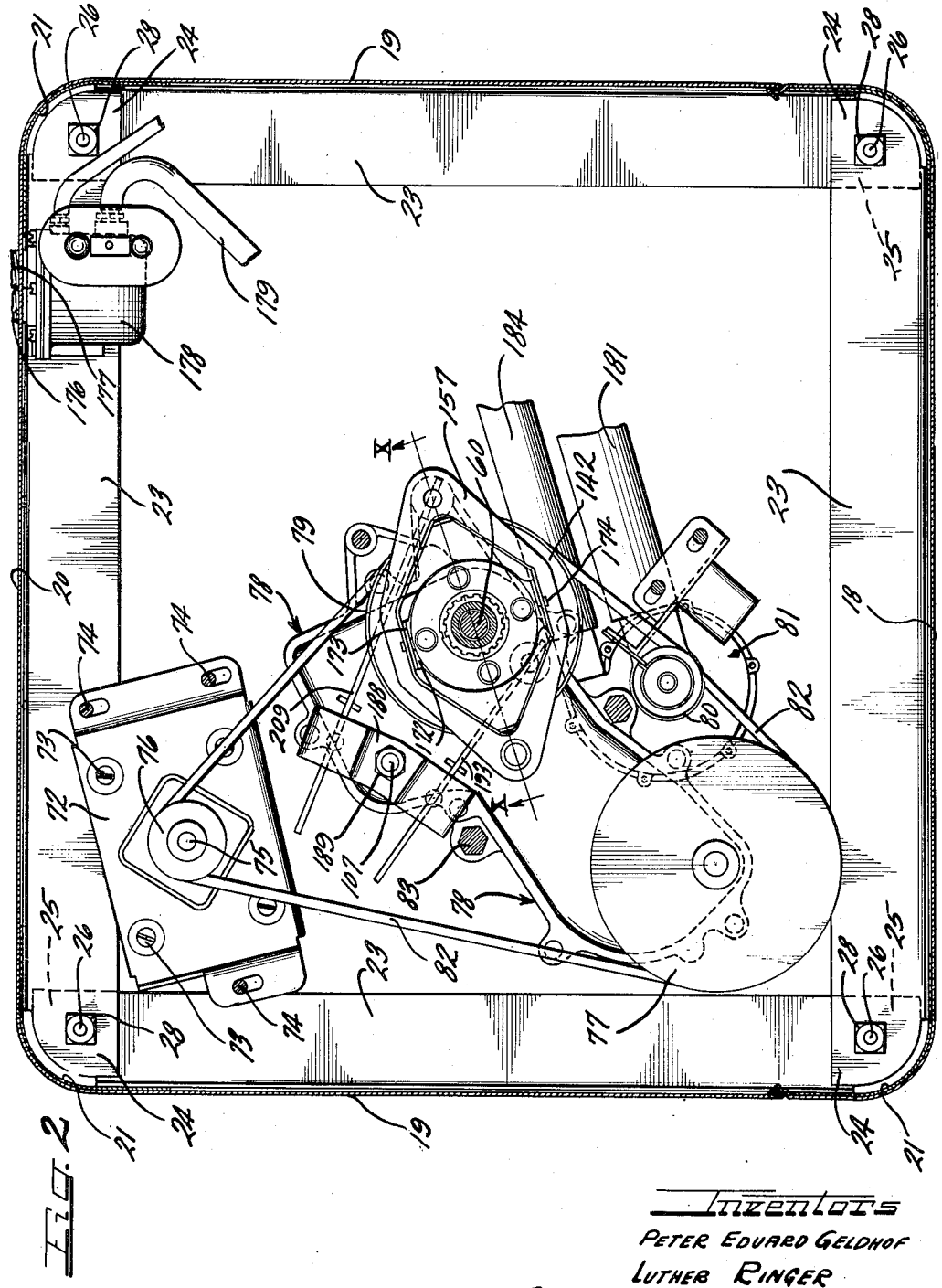

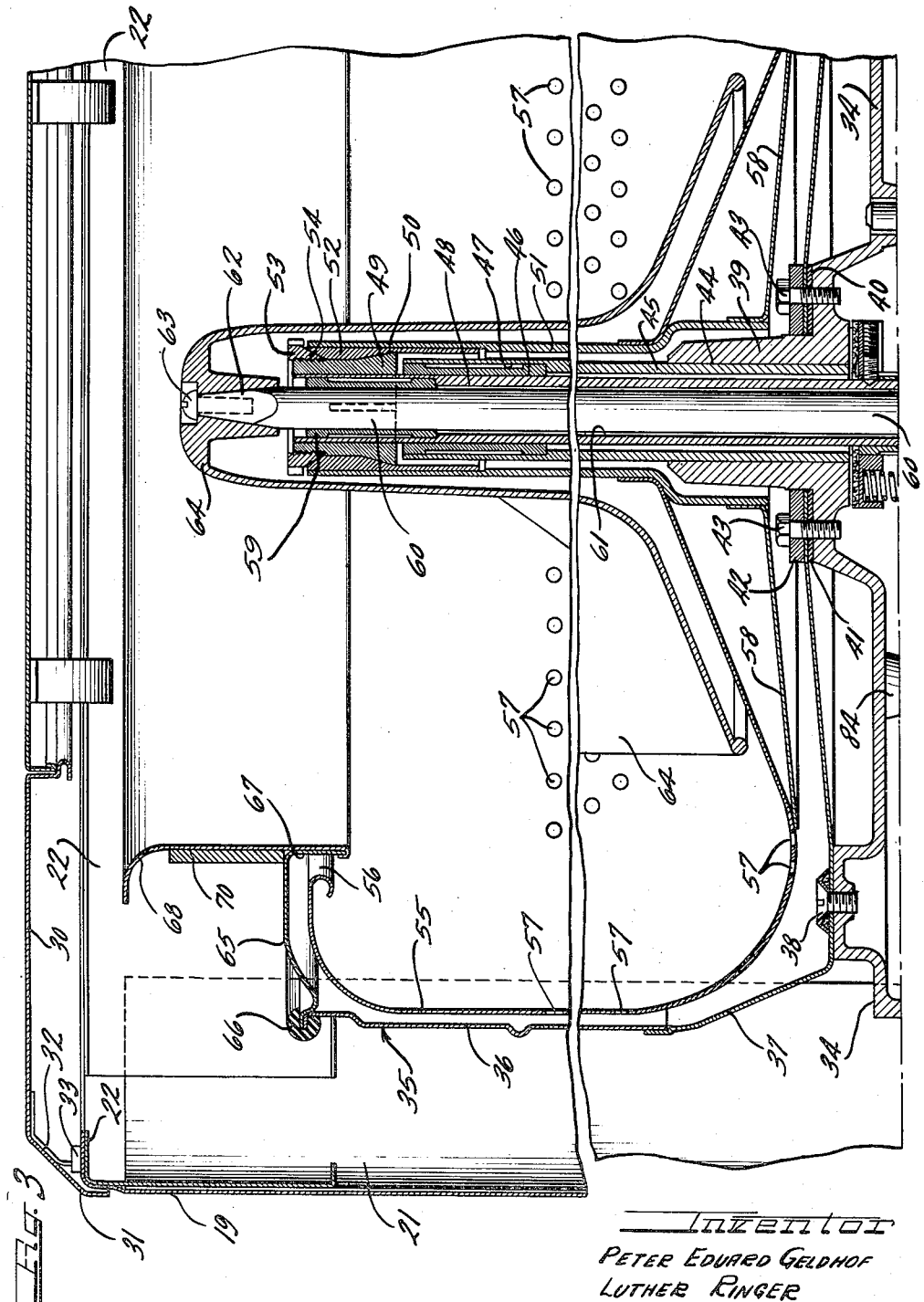

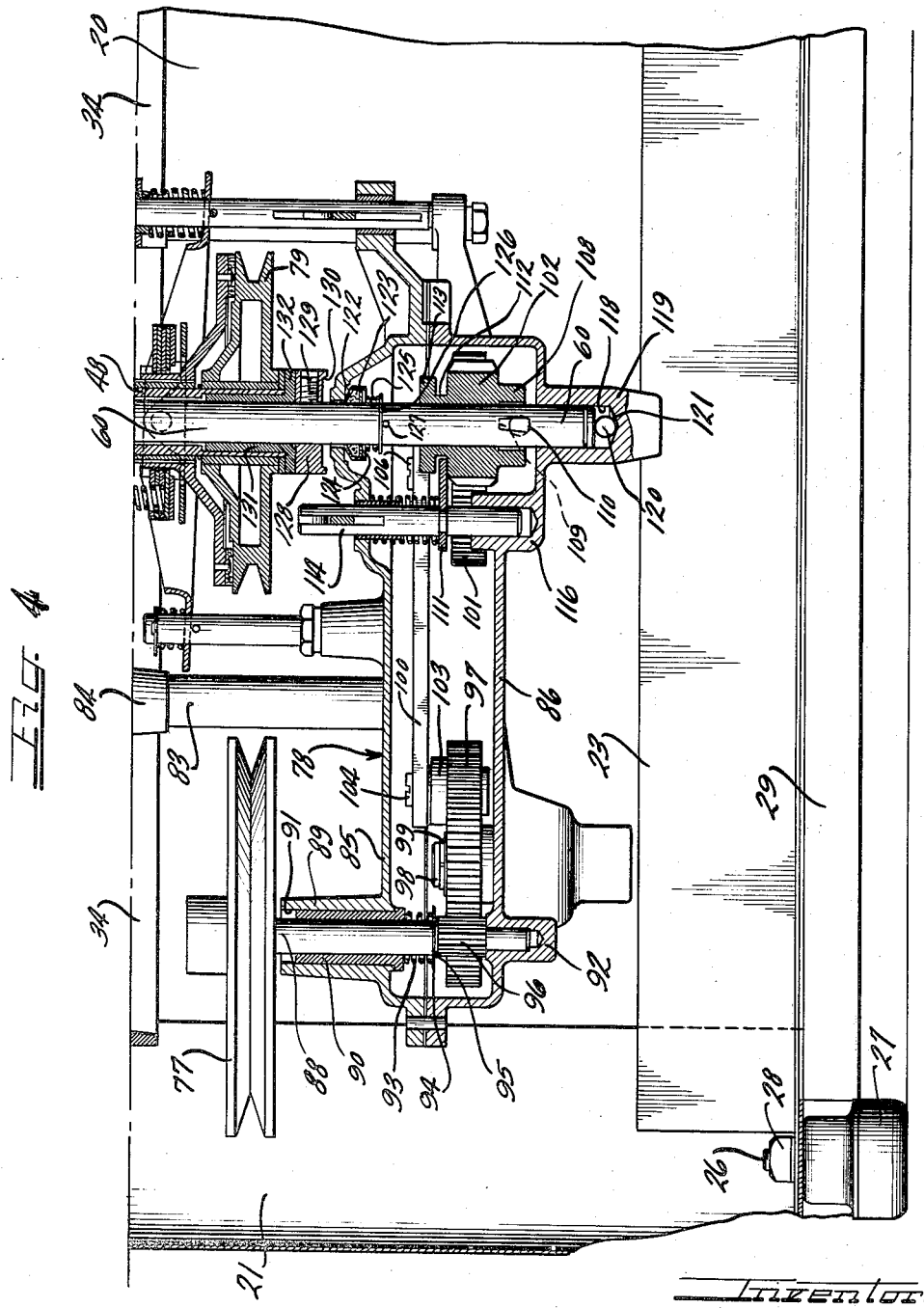

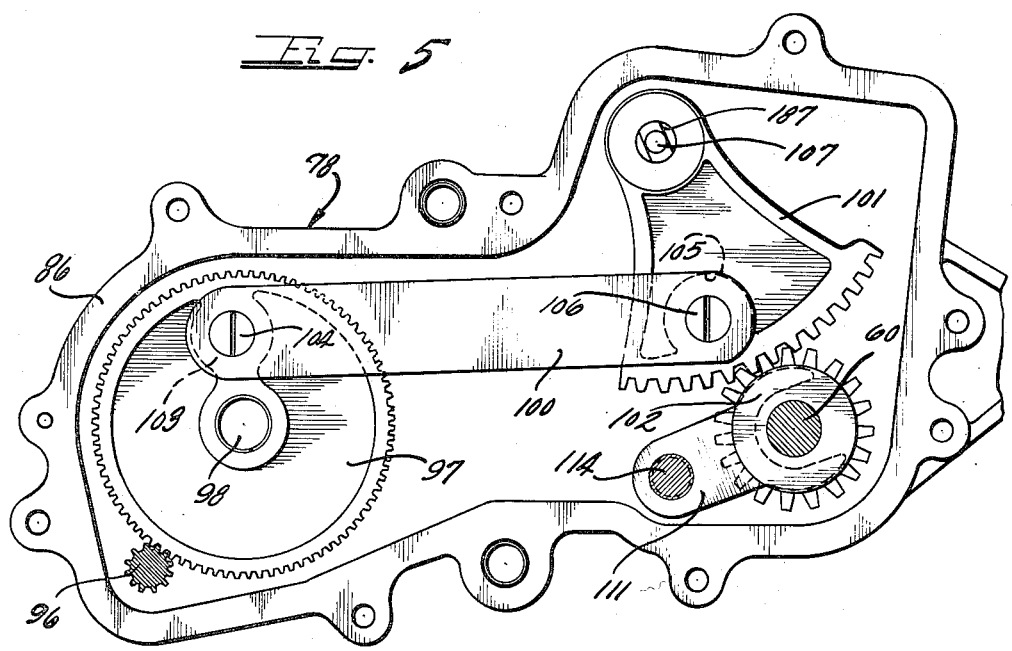
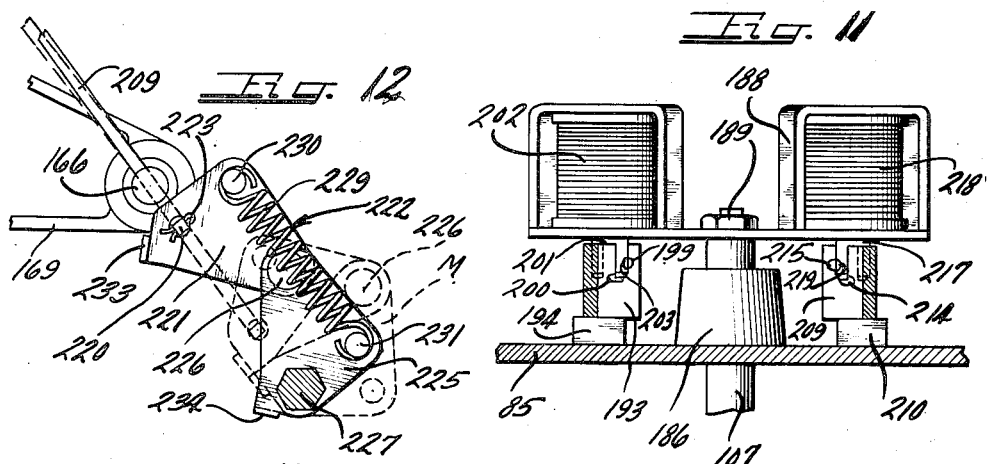
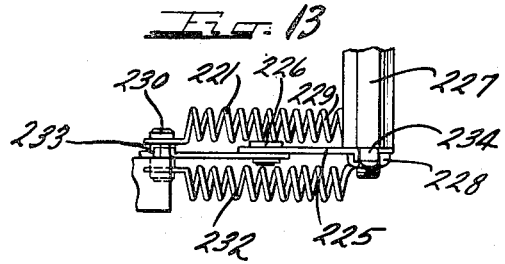

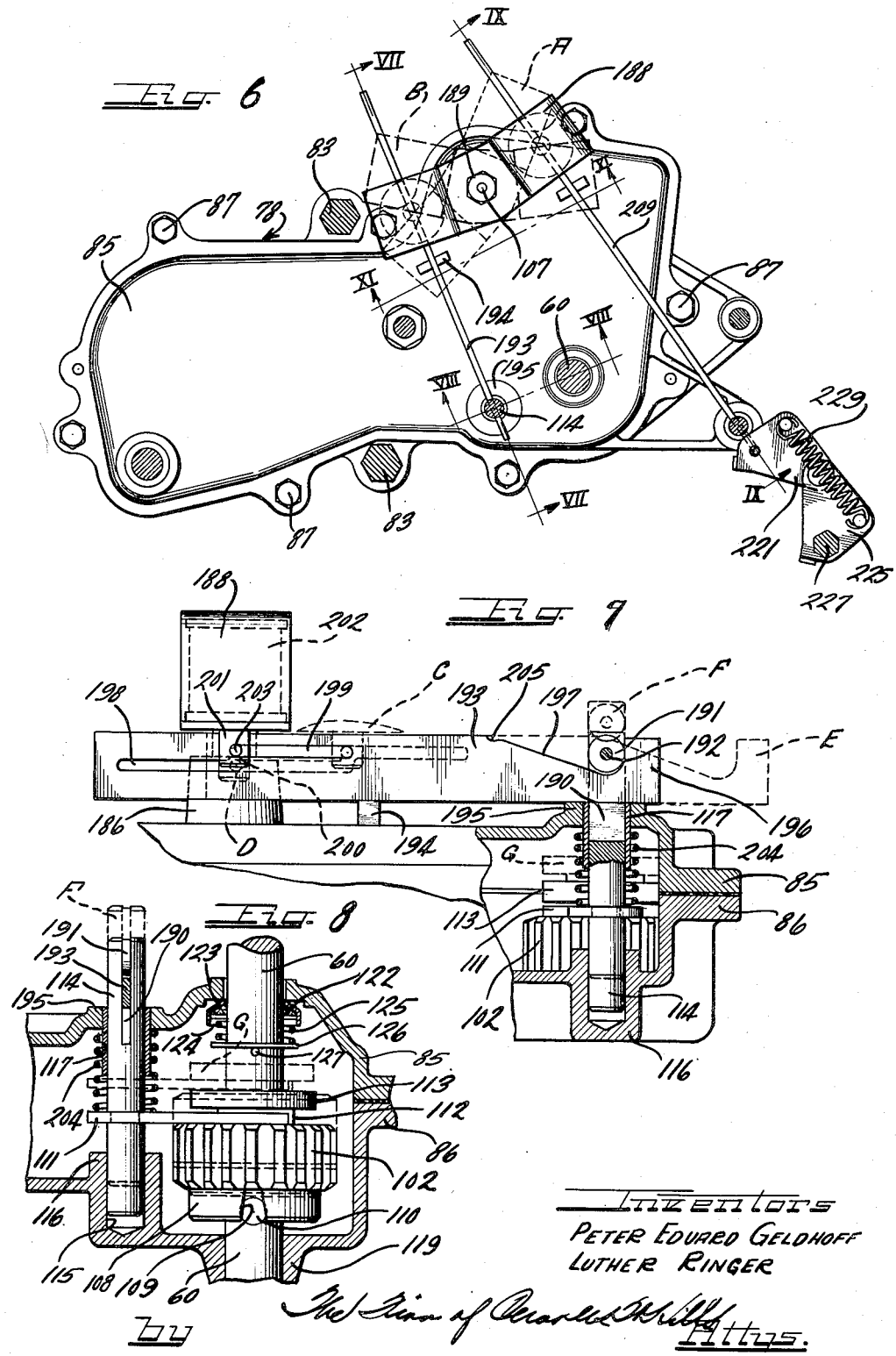

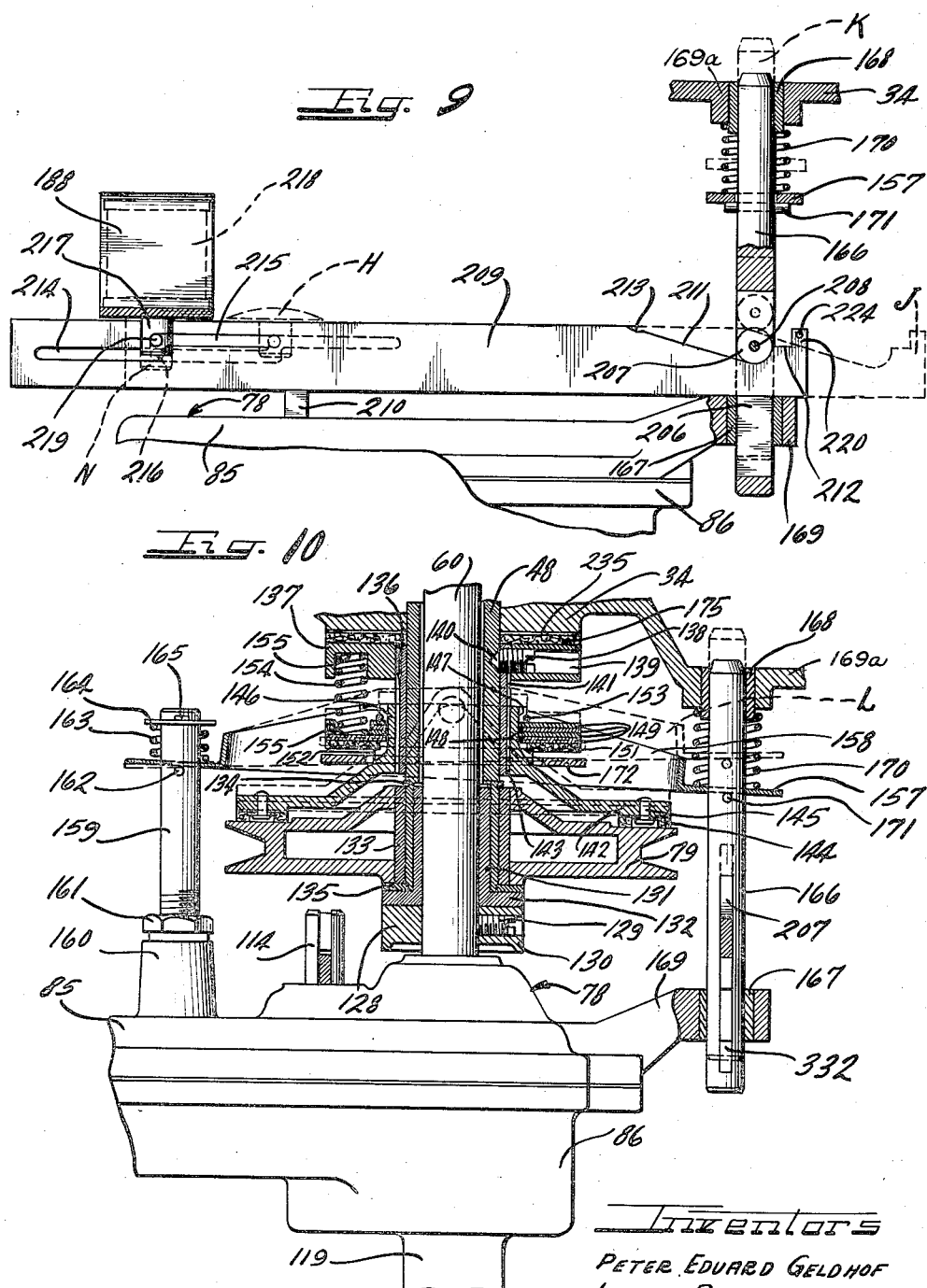

2,625,248

UNITED STATES PATENT OFFICE 2,625,248

CONTROL AND DRIVE MECHANISM FOR AUTOMATIC WASHING, RINSING, AND DRYING MACHINES

Peter Eduard Geldhof and Luther Ringer, St. Joseph, Mich., assignors to Whirlpool Corporation, St. Joseph, Mich., a corporation of New York Original application June 21, 1943, Serial No. 491,618, now Patent No. 2,521,159, dated September 5, 1950. Divided and this application July 31, 1947, Serial No. 765,200

14 Claims. (Cl. 192—116.5)

This invention relates to an automatic washing, rinsing and drying machine, and more particularly, to the control and drive mechanism therefor.

This application is a division of our copending application for "Automatic Washing, Rinsing and Drying Machine," U. S. Serial No. 491,618, filed June 21, 1943, now Patent No. 2,521,159, issued September 5, 1950, and assigned to the same assignee as the present invention.

In this parent application we have disclosed a novel washing, rinsing and drying machine consisting of a novel pump unit for removing the cleansing fluid from the tub of the machine and a novel method of and means for controlling the operation of such a pump unit. Also, we have disclosed a novel form of fluid responsive control mechanism for controlling the fluid level in the apparatus as well as starting and stopping certain of the operations associated with the fluid level which are to be performed by the automatic washing, rinsing and drying machine. A still further disclosure in this parent application, is the novel tub assembly and means for detachably securing the same in operable relation to the tub and the extractor or drying basket, together with means for preventing excessive gyratory motion of the elements of the apparatus due to unbalanced loads.

It is well appreciated by the washing machine industry that the efficiency and effectiveness of a domestic laundry machine depends to a large part upon the efficiency and effectiveness of the transmission and drive control mechanism. While automatic washing machines were employed in the commercial field for years, they were slow in gaining any great degree of popularity in the domestic field, due either to the complexity of the control mechanism and to the relatively high cost made necessary by an elaborate and costly control mechanism.

One of the principal features and objects of the present invention is to provide a novel control and drive mechanism for automatic washing, rinsing and drying machines.

A further object of the present invention is to provide a novel electro-mechanical control for an automatic washing machine.

A still further object of the present invention is to provide a novel control mechanism for the operation of the agitator and drying basket driving means in an automatic washing machine.

Another and further object of the present invention is to provide a novel pump unit for removing the cleansing fluid from the tub of the automatic washing, rinsing and drying machine in the course of its operation and a novel method of and means for controlling the operation of such a pump unit.

Still another and further object of the present invention is to provide novel mechanism and means for clutching and declutching the agitator and the clothes basket to the power transmission unit of an automatic washing, rinsing and drying machine.

The novel features which we believe to be characteristic of our invention are set forth with particularity in the appended claims. Our invention itself, however, both as to its organization, manner of construction and method of operation, together with further objects and advantages thereof may best be understood by reference to the following description taken in connection with the accompanying drawings, in which:

Figure 1 is an elevation of a washing machine with parts of the cabinet removed to illustrate the operating relationship of the several parts of the apparatus and embodying the novel teachings and principles of the present invention;

Figure 2 is a horizontal section through the machine taken along the line II—II of Figure 1;

Figures 3 and 4 together form a vertical section through the machine of Figure 1, Figure 3 being the upper portion of the machine with parts broken away, and Figure 4 being the lower portion of the machine with parts in elevation and broken away;

Figure 5 is a plan view of the transmission unit for actuating the agitator and having the upper portion of the case removed to show the mechanism therein;

Figure 6 is a plan view of the transmission unit of Figure 5 and the associated control mechanism which directs the operation of the agitator and the extractor;

Figure 7 is a vertical section through a portion of the transmission unit and the associated control mechanism of Figure 6 taken substantially along the line VII—VII therein with parts in elevation;

Figure 8 is a partial vertical section through the transmission unit of Figure 6 as seen from the line VIII—VIII therein with parts in elevation;

Figure 9 is a vertical section through a portion of the control mechanism associated with the transmission unit of Figure 6 as seen from the line IX—IX therein with parts in elevation;

Figure 10 is a vertical section through the extractor drive unit as seen from the line X—X of Figure 2 with parts in elevation;

Figure 11 is a vertical section showing a portion of the control mechanism as seen from the line XI—XI in Figure 6;

Figure 12 is a plan view of a part of the control mechanism for operating the extractor and associated with the transmission unit; and Figure 13 represents a side elevation of the device of Figure 12.

Referring first to Figures 1 to 4 of the drawings, the automatic washing, rinsing and drying machine illustrated therein has had its exterior shell or cabinet removed for better inspection of the various component parts of the machine.

The principal frame structure embodies four corner posts 21 to each of which is secured an end of the upper channel members 22 and the lower angle members 23. The channels 22 and the angles 23 may be secured in any suitable fashion to the vertical posts 21, but are preferably welded to the posts 21.

A portion of the ends of the vertically extending legs of the angles 23 and a portion of the horizontally disposed legs thereof are cut away to form the substantially arcuate segments 24 at the ends of the angles 23 associated with the front panel 18 and the rear panel 20 of the cabinet which are disposed in overlapping relation to similarly form segments 25 of the angles 23 which are associated with the side panels 19 of the machine, as will readily be apparent from Figure 2 of the drawings. Each pair of overlapping segments 24 and 25 are apertured to receive the bolt 26 forming part of the foot 27 which is secured to the angles 23 as by means of the nut 28.

On the underside of the horizontally disposed legs of the angles 23 of the frame structure are secured the angle member 29 as will be seen in Figures 1 and 4 of the drawings. The lowermost edges of each of the several panels 18, 19 and 20 may be demountably attached to the angle members 29 as by means of any of several suitable forms of attaching means.

A cover 30 is provided for the cabinet (see Figure 3) which has a downwardly extending flange portion 31 to provide a snug fit between the cover 30 and the panels 18, 19 and 20 as the case may be. The cover 30 may be secured to the frame in any suitable fashion but is provided on the underside thereof with a pair of locating means which take the form of bent strips 32 secured to the underside of the cover 30 and adapted to register with a plurality of blocks 33 of some suitable resilient material so as to render the fit of the cover 30 with respect to the remainder of the cabinet tight and free from vibration.

Substantially all of the operating and control mechanism of the automatic washing machine is suported within the cabinet on a sub-base 34 which is preferably in the form of a casting or spider and which is suspended from the frame structure in any suitable manner (not shown).

Mounted on the upper side of the spider or sub-base 34 is the tube 35 which comprises a substantially cylindrical wall 36 and a base portion 37, secured to spider 34 as by means of bolts 38 and being centrally apertured to permit the generally cylindrical boss portion 39 of the spider to pass therethrough. An annular shoulder 40 encircling the base of the cylindrical boss 39 cooperates with the gasket 41 and the ring 42 secured to the shoulder 40 as by bolts 43 to prevent leakage of the cleansing fluid from the aperture in the base 37 of the tub 35 which accommodates the boss 39. The boss 39 of the spider 34 is provided with a bore 44 in which is suitably secured a vertically extending generally cylindrical center post 45.

The center post 45 is provided adjacent its uppermost end with a sleeve bearing 46 which is press fitted into the counterbore 47 of the internal bore of the center post 45. A hollow shaft 48 is journaled at its uppermost end in the sleeve bearing 46 for rotation in concentric relation to the axis of the center post 45. Disposed about the hollow shaft 48 and adjacent its uppermost end is a collar 49 which may be press fitted or otherwise suitably secured to said hollow shaft 48. The collar 49 is provided with a lower tapered portion 50 which serves as a mounting for the supporting member 51 in the upper end of which is inserted a sleeve 52, the internal contour of which corresponds to the tapered portion 50 of the collar 49.

A retaining ring 53 is threaded onto the upper end of the collar 49 and is provided with a tapered portion 54 at its lowermost end which engages the upper end of the sleeve 52 so as to force it against the tapered portion 50 of the collar 49. The lower end of the supporting member 51 is flared outwardly so as to encircle the uppermost end of the boss 39 of the spider 34. The supporting member 51 serves as a mounting for the perforated extractor basket 55 which is secured thereto in any suitable fashion adjacent the flared end thereof.

The basket 55 is provided with an opening 56 in the uppermost end thereof and a plurality of perforations 57 in the generally cylindrical wall and the base thereof disposed in suitably spaced relation as shown, in part, in Figure 3 of the drawings. A plate 58 of substantially disklike shape is secured to the lowermost end of the supporting member 51 and extends substantially radially therefrom to contact the base of the basket 55 and to serve as a stiffening means therefor.

A sleeve bearing 59 is disposed internally of and adjacent the uppermost end of the hollow shaft 48, said bearing 59 providing a journal for the vertical shaft 60 which extends through the bore 61 of the hollow shaft 48 for rotation in concentric relation to the axis of said hollow shaft 48 and the center post 45. The end of shaft 60 which projects beyond the upper end of hollow shaft 48 has a tapered and squared portion 62 on which is secured, as by means of the bolt 63, an agitator 64 of the multiple vane type.

An annular rim 65, which provides a safeguard against the possibility of the operator inadvertently inserting his hand between the upper end of the basket 55 and the tub 35 when the apparatus is operating and also prevents the escape of the cleansing fluid from the tub 35 in the course of the operation of the machine, is demountably secured to the upper end of the tub 35 as by means of the flexible retaining ring 66. The retaining ring 66 renders it possible to remove said annular rim 65 if for any reason it should be necessary to have access to the basket 55 or for the removal of the same from the tub 35. The annular rim 65 is provided with a depending portion 67 which is bent downwardly so as to extend within the opening 56 in the upper end of the basket 55.

A substantially funnel-shaped annular member 68 is secured in any suitable fashion to the depending portion 67 of the annular rim 65 and extends upwardly therefrom to a point adjacent the cover 30 of the cabinet so as to aid in the introduction to the machine of the clothing or other articles to be laundered as they are passed through the lid 69 of said cover 30. A weighted collar 70 which is advantageously disposed about the external periphery of the member 68 is provided to supply added weight to the assembly of operating elements mounted upon the upper side of spider 34 which will tend to reduce the extent of the swinging movement of the freely supported spider 34.

Turning our attention now to Figures 1 and 2 of the drawings, it will be apparent that the driving mechanism for actuating the agitator 64 and the basket 55 is suspended from and mounted on the underside of the spider 34. Power is derived from an electric motor 71 which is secured to a bracket 72 by means of the bolts 73, said brackets being suspended from the spider 34 as by means of the bolts 74. The motor 71, in the illustrated embodiment of the invention, is of the vertical type and so disposed that its shaft 75 extends through the bracket 72 so as to accommodate the pulley 76. The pulley 76 of the motor 71 is adapted to drive a pulley 77 which actuates the transmission unit 78, the pulley 79 for driving the hollow shaft 48 upon which the basket 55 is supported, and the pulley 80 which operates the pump unit 81, all of said pulleys being connected by an endless belt 82.

The transmission 78, which is illustrated in greater detail in Figures 4, 5 and 6 of the drawings, is supported from the underside of the spider 34 by means of the suspension members 83 which are secured to the bosses 84 on said spider 34 as by means of bolts extending therethrough.

The operating mechanism of the transmission unit 78 is enclosed in a casing comprising upper and lower members 85 and 86, respectively, held together by the bolts 87. The pulley 77 for driving the transmission unit 78 is mounted upon a vertical shaft 88 which extends through the boss 89 projecting from the upper casting 85 of the transmission case and is journaled adjacent its upper end in a sleeve bearing 90 which is press fitted into the bore 91 of the boss 89. The lowermost end of the shaft 88 is supported and journaled in the boss 92 formed in the wall of the lower casting 86 of the transmission case. A compression spring 93 which surrounds the shaft 88 and abuts the lower end of the sleeve bearing 90 serves to force the washer 94 against a snapring 95 which is positioned on the shaft 88 in an annular groove cut therein so as to maintain said shaft 88 in its proper axial disposition.

A plurality of gear teeth 96 may advantageously be cut on the periphery of the shaft 88 to engage a spur gear 97 which is rotatably mounted upon a stub shaft 98 and maintained in proper endwise relation with respect thereto by means of the snap-ring 99 which is adapted to engage an annular groove formed on said stub shaft 98. The spur gear 97, through the link or crank arm 100, operates a gear sector 101 which is meshed with a gear 102 rotatably mounted upon the shaft 60 to which the agitator 64 is attached. While the crank arm 100 may be connected to the gear 97 and the gear sector 101 in any suitable fashion, it is advantageously mounted in pivotal relation to a boss portion 103 formed on the web of the gear 97 by means of the bolt 104 which is threaded therein, and at its other end upon the boss portion 105 formed upon the gear sector 101 being pivotally secured thereto by the bolt 106. The gear sector 101 is secured to a vertically extending pin 107 which is adapted to oscillate about its longitudinal axis as the gear sector 101 is operated by the crank 100, due to the eccentric mounting thereof upon the spur gear 97.

As will best be seen in Figures 4 and 8 of the drawings, the gear 102 is disposed in axially slidable relation with respect to the vertical shaft 60. The lower hub portion 108 of gear 102 is provided with a plurality of slots 109 extending substantially axially thereof and tapered slightly to fit over the end of a pin 110 which is mounted in shaft 60 so as to extend radially therefrom. The gear 102 is movable axially of the shaft 60 in the manner illustrated in Figure 8 of the drawings in which a fork 111 which registers with an annular groove 112 cut into the upper hub portion 113 of the gear 102 so as to engage or disengage one of the slots 109 in the lower hub portion 108 of said gear 102 with the radially disposed pin 110 on the shaft 60. The fork 111 is secured to a vertically extending rod 114 which is adapted to slide endwise in the bore 115 of the internal boss 116 formed in the lower casting 86 of the transmission case, and a sleeve 117 mounted in the upper casting 85 of said transmission case. The rod 114 is advantageously raised and lowered by a control mechanism which will be described in detail hereinafter.

The shaft 60, which, as previously described, is journaled within the bore 61 of the hollow shaft 48, is concentrically disposed within the center post 45 and extends downwardly within the bore 44 of the boss 39 through the spider 34 and into the transmission unit 78. The lower end of the shaft 60 is journaled in the bore 118 of a boss 119 depending from the lower casting 86. A steel ball 120 which is disposed in the inverted conically shaped base 121 of the bore 118 of said boss 119 serves as a thrust bearing thereby supporting the shaft 60 in proper endwise relation.

On the underside of the top casting 85 of the case enclosing the transmission unit 78 and encircling the shaft 60 adjacent the point where it extends through said top casting 85 is a packing unit comprising an inverted cup-shaped holder 122 for retaining the packing 123 which serves to prevent the entrance of dirt, dust or other substances into the transmission case in which the several parts are immersed in a lubricating medium as well as to prevent leakage of the lubricating medium from the case. The packing 123 is retained in the cup-shaped holder 122 as by means of a disk member 124 held in place by a compressed spring 125 urged thereagainst by a washer 126 disposed endwise of the shaft 60 by means of a pin 127 therein.

A collar 128 is secured to the shaft 60 at a point just above that at which said shaft 60 extends through the top casting 85 of the case enclosing the transmission unit 78, as by means of the set screw 129, said collar being provided with a depending skirt portion 130 which extends downwardly over the opening in top casting 85, through which shaft 60 passes (see Figure 10). The collar 128 acts as a means of supporting the hollow shaft 48 by virtue of the fact that the sleeve bearing 131 fits into the hollow shaft 48 at its lowermost end and is provided with an annular flanged portion 132 which contacts the upper face of the collar 128. A pulley 79, which, as previously explained, is driven from the motor 71 by means of the endless belt 82, is rotatably mounted about the external periphery of said hollow shaft 48 as by means of the bushing 133 which is press fitted into said pulley 79. The pulley 79 is retained in endwise relation to said shaft 48 by means of a snap-ring 134 and washer 135 which is riveted or otherwise suitably secured to the lower end of shaft 48 and contacts the upper face of the flanged portion 132 of the sleeve bearing 131.

Mounted upon the hollow shaft 48 at a point just below that at which it passes through the spider 34 (Figure 10), are a sleeve member 136 and an annular member 137 extending about the outer periphery of the sleeve 136, both of said members being secured to the hollow shaft 48 as by means of the set screw 138 which is threaded into the radially extending hole 139 in said annular member 137 so as to register with the depression 140 in the outer wall of the hollow shaft 48. The external periphery of the sleeve 136 is splined as at 141 and is adapted to accommodate in slidable relation with respect thereto a flanged member 142, the bore 143 of which is adapted to cooperate with said splined portion 141. The flanged member 142 is provided with a ring 144 of suitable brake material affixed thereto by a plurality of rivets 145 or other like fastening means so as to provide a contacting surface which will frictionally engage the upper surface of the pulley 79 and transmit momentum from the driven pulley 79 to the hollow shaft 48 upon which, as we have seen, the basket 55 is mounted.

The shank portion 146 of the flanged member 142 has a pair of diametrically opposed vertically extending slots 147 cut therein with which lugs 148 on each of a plurality of disks 149, which form an annular member of laminated construction, register to prevent relative rotation of said annular member with respect to said shank portion 146. A ring 151 of brake material or the like is secured in any suitable fashion to one face of the lowermost disk 149 of the annular member. The ring 151 is seated against an annular shoulder 152 formed on the shank portion 146 at a point adjacent the base of the slot 147, said shoulder cooperating with a snap-ring 153 to hold the annular member in proper endwise relation to shank portion 146. A plurality of compression springs 154 disposed in the registering sockets 155 formed in the annular members 137 and disks 149 are adapted to urge the flange member 142 in driving contact with the rotating pulley 79.

A member 157 of substantially diamond shaped formation and having a centrally disposed vertically extending wall 158 encloses the structure hereinbefore described and is mounted in tiltable relation to the fixed post 159 which is threaded into a boss 160 on the exterior of the top casting 85 in such fashion that it may be adjusted lengthwise thereof and be locked in place as by means of the lock nut 161. The member 157 is positioned vertically of the post 159 by means of the pin 162 therein and a compression spring 163 urged against the upper face of said member 157 by the washer 164 held in place by a cotter pin 165 or other suitable fastening. The opposite end of said member 157 is carried by a rod 166 which is disposed in axially slidable relation in a pair of bushings 167 and 168 mounted respectively in arms 169 and 169a which may advantageously be formed integrally with the top casting 85 of the casing housing transmission unit 78 and the spider 34, respectively. A compression spring 170 disposed between the bushing 168 in the spider 34 and the upper face of the member 157 serves to urge said member 157 against a pin 171 in the rod 166.

The member 157 supports from the vertically extending wall 158 thereof a braking disk 172 which is mounted as by means of the vertically extending lugs 173 (see Figure 2) in pivotal relation about the pins 174 which extend through the oppositely disposed segments of the wall 158. The parts of the apparatus just described, when they are disposed in the positions illustrated in solid lines as shown in Figure 10 of the drawings, are in operating relation such that the pulley 79 is driving the hollow shaft 48 and is, therefore, rotating the basket 55 mounted thereon. The rotation of the hollow shaft 48 is stopped by raising the vertically extending rod 166 to the position indicated in dotted lines and thereby raising the entire mechanism associated therewith into the corresponding dotted line position by the means and in the manner hereinafter described in detail.

It will be understood that when the rod 166 is raised the braking disk 172 pivotally mounted upon the wall 154 of the member 157, which when raised occupies a substantially horizontal position as shown in the dotted lines in Figure 10, will be caused to contact the ring 151 of braking material affixed to the lowermost disk 149 of the annular member 156 and will cause the springs 154 to be compressed. The lifting of the braking disk 172 against the annular member 156 which is affixed to the shank portion 146 of the flange member 142 will contemporaneously cause the latter to be raised so that the contact between the braking material ring 144 and the driving surface of the pulley 79 will be broken. The rotation of the hollow shaft 48 will be stopped by reason of the contact of the braking disk 172 with the ring 151, the frictional engagement therebetween gradually bringing the rotating hollow shaft 48 to a halt. In addition, a ring of suitable braking material may be affixed to the upper surface of the annular member 137 as indicated by the reference character 175 so as to furnish an additional braking surface for the rotating parts associated with the hollow shaft 48 against a surface 176 formed on the spider 34 by reason of a slight endwise movement of the hollow shaft 48.

The filling and draining mechanism of the automatic washing machine forms no direct part of the present invention, and for that reason it will be sufficient to say that hot and cold water is supplied through the inlets 176 and 177 to an automatic temperature controlled mixing valve 178. The outlet side of the mixing valve 178 connects with a hose 179 which is arranged to deliver water to the tub 35.

The base 37 of the tub 35 is provided with a sump 180, the bottom of which connects with the pump 81 through the hose connection 181 which leads to the inlet side 182 of the pump 81.

The outlet or discharge side 183 of the pump 81 connects through a hose 184 to a drain or catch basin (not shown).

The pump unit 81 is adapted to be actuated by the pulley 80 driven from the motor 71 by means of the belt 82. An automatic disconnecting means is adapted to direct the operation of the pump 81. The pump 81 will, of course, be halted during those stages of the operation of the automatic washing machine when it is desired to retain the water in the tub 35.

Clutch mechanism generally indicated by the reference character 185 is arranged to connect the drive pulley 80 to the impeller (not shown) of the pump 81.

The washing machine is provided with any suitable sequence timer such, for example, as that described in our copending application, Serial No. 491,618, now Patent No. 2,521,159, which will sequentially energize the various electrically operated elements of the washing machine. Since the operation of the sequence timer itself forms no part of the present invention, the sequence timer will not be described in detail herein. The sequence timer will hereinafter be referred to as the "control circuit." It will be sufficient for the purposes of understanding the present invention, if it is understood that when it is specified that the control circuit energizes a certain solenoid or element, it is the sequence timer which is effecting such a supply of electric current.

As those skilled in the art are well aware, the sequence timer of an automatic washing machine is arranged to carry the washing machine through a cycle of operation which may include, for example, first the filling of the tub 35 with soapy water, then oscillating the agitator 64, then draining the water from the tub 35, then rotating the basket 55 at high speed to extract the water from the clothes. The same group of steps may then be repeated, except this time clear fresh water is used rather than soapy water in order to effect the rinsing of the clothes.

The control mechanism for the agitator and extractor is one of the principal features of the present invention.

Referring now to Figures 2 and 4 to 13, the details of this control mechanism will be described.

It will be recalled from the description of the transmission unit 78 illustrated in Figure 5 of the drawings that the vertically extending pin 107 therein is adapted to oscillate about its longitudinal axis by virtue of the fact that the gear sector 101 is secured thereto and actuated by the reciprocating crank 100. The pin 107, adjacent its uppermost end extending through the boss 186 formed on the outer surface of the upper casting 85, is provided with flattened surfaces 187 so as to cooperate with a similarly shaped slotted opening in the mounting 188 which is secured to said pin 107 as by means of the nut 189 threaded upon the end thereof. It will be understood that the mounting 188 by reason of its being secured to the pin 107 will be actuated in the manner illustrated in dotted lines in Figure 6 of the drawings, passing in the course of its oscillatory cycle from the one extreme position designated by the reference character A to the other extremity designated by reference character B and forming an oscillating control member for alternately controlling operation of the agitator drive mechanism and the extractor drive mechanism, as will now be described.

The control mechanism for directing the operation of the agitator drive mechanism will be described first. It will be recalled from the description of the transmission unit 78 that the actuation of the agitator shaft 60 is brought about by the engagement of one of the slots 109 formed in the hub 108 of the gear 102 with the pin 110 secured to said shaft 60 as said gear 102 is lowered. The fork 111 mounted upon the rod 114 serves, as we have seen, to raise and lower the gear 102 to accomplish its engagement with and disengagement from the pin 110. The rod 114 as will be apparent from Figures 7 and 8 of the drawings is provided with a vertically extending slot 190 adjacent and extending toward its uppermost end. Within the open end of the slot 190, is disposed a roller 191 rotatably mounted about a pin 192 extending transversely of the slot 190.

A bar 193 slidably supported by a vertically extending abutment 194 formed on the surface of the top casting 85 for the case of the transmission unit 78 and the upper surface of a boss 195 through which the rod 114 projects is adapted to slide endwise in the slot 190 formed in said rod 114 being retained therein by the roller 191. A vertical projection 196 is provided on the end of the bar 193 which extends through the slot 190 to facilitate the retention of the bar 193 in position in the slot 190 and forms an abutment for the inclined surface 197 provided adjacent thereto for accommodating the movement of the roller 191 when the control mechanism is set into operation.

Near the end of the bar 193 opposite to that at which is disposed the projection 196, slots 198 and 199 are provided extending horizontally of said bar 193 and slightly offset one from the other but having the ends thereof disposed adjacent each other joined by a short vertically extending slot 200. The plunger 201 of a solenoid 202 secured to one end of the mounting 188 is attached to the bar 193 by a slotted and pinned connection embodying the pin 203 which engages and moves longitudinally of one or the other of the slots 198 or 199 and forms a clutch engageable with the ends of the slots 198 or 199 for moving the bar 193 in one direction or another as desired in a manner presently to be explained in detail.

When the several parts of the control mechanism in the positions illustrated in full lines in Figure 7, the gear 102 is engaged in driving relation with the shaft 60 thereby causing the agitator 64 to be actuated. A compression spring 204 the uppermost end of which is positioned about the sleeve 117 so as to bear against the underside of the boss 195 serves to urge the fork 111 and rod 114 to which it is secured into their lowermost positions as shown in Figure 8. During this interval while the agitator drive mechanism is operating, the solenoid 202 is energized so that the plunger 201 thereof is in its retracted position, as shown in Figure 7. Since the mounting 188 to which the solenoid 202 is secured is pivoted about the pin 107, the pin 203 in the plunger 201 thereof moves laterally from one extremity of the slot 199 in bar 193 to the other shifting during its reciprocation from the position in full lines to that indicated in dotted lines and designated by reference character C.

When that point in the cycle of operations of the automatic washing machine is reached, at which the operation of the agitator 64 is to be halted, the control circuit causes the solenoid 202 to be deenergized as a result of which the plunger 201 thereof is permitted to drop down. It will be understood that should the solenoid 202 when the pin 203 in the plunger 201 is traversing the slot 199 in bar 193 be positioned at some point therein other than that adjacent the vertical slot 200, the plunger 201 will be temporarily suspended by the pin 203 until, by the reciprocation of the mounting 188, the pin 203 reaches the slot 200. The slot 200 will then permit the plunger 201 to drop down so that the pin 203 thereof will then be disposed in the slot 198 and will occupy the position D shown in dotted lines. At this point in the operation of the control mechanism being described, the mounting 188 will occupy the position B, as seen in Figure 6, and will begin its movement toward position A at the other extremity of its reciprocatory cycle. In so doing, the pin 203 of the plunger 201 now disposed in position D abuts against the right-hand end of the slot 198, and, as the mounting 188 moves the solenoid 202 and its plunger 201 toward the right as seen in Figure 7, the bar 193 will be caused to be shifted in the same direction until it occupies substantially the dotted line position E.

As the bar 193 is urged toward the right by the pin 203 in the plunger 201, the roller 191 rotatably mounted upon the rod 114 which previously was disposed adjacent the projection 196 of said bar 193 will be caused to move along the inclined surface 197 of the bar 193 thereby raising the rod 114, fork 111 and the gear 102 in engagement therewith against the compression spring 204 until they occupy the dotted line positions designated by the reference character F. The roller 191 will thereafter be positioned in the cupped depression 205 adjacent the left-hand extremity of the inclined surface 197 and the gear 102 will be disposed in the dotted line position G (see Figures 7 and 8) and, as a result, the slot 109 in the hub 108 thereof will be out of engagement with the pin 110 in the shaft 60 thus causing the operation of the agitator 64 to cease. It will, of course, be understood that the slots 198 and 199 in the bar 193, by virtue of the shifting of said bar 193 to the right, will thereafter occupy the positions shown in dotted lines in Figure 7 of the drawings. The pin 203 in the plunger 201 of the solenoid 202 will then be caused to traverse the slot 198 in its advanced position until such time as the solenoid 202 is again energized.

When, in the course of the operation of the automatic washing machine, the agitator 64 is again to be actuated, the control circuit will cause the solenoid 202 to be energized tending to raise the plunger 201 into the position corresponding to position C in Figure 7 when the pin 203 reaches the vertical slot 200. The pin 203 will then be disposed in the slot 199 but at the extreme left-hand end of said slot 199 which now occupies the dotted line position shown in Figure 7, and, as before, upon the movement of the mounting 188 from the dotted line position A toward the opposite dotted line position B in Figure 6 the bar 193 will be moved toward the left as seen in Figure 7 until it again occupies the position shown in full lines therein. As a result, all of the several parts of the control mechanism will again assume the positions which they occupied at the beginning of the operation just described.

Attention is now directed to the control mechanism for directing the operation of the extractor drive mechanism which is generally similar to that just described for controlling the operation of the agitator drive mechanism. It will be recalled from the general description of the operation of the extractor drive mechanism, that the vertically disposed rod 166 is slidable in an axial direction in the bushings 167 and 168 mounted in the arm 169 and the spider 34, respectively, to bring about the engagement and disengagement of the member 189 with respect to the drive pulley 79 by actuating the hollow shaft 48 and thereby the basket 55. The control mechanism which is provided in the apparatus of the present invention is intended to bring about the movement of the member 157 at the proper predetermined time in accordance with the operation of the control circuit which instigates the several operations of the automatic washing machine.

The rod 166 is provided with a vertically extending slot 206 disposed adjacent its lowermost end. A roller 207 is rotatably secured in the slot 206 as by means of a pin 208 disposed transversely of the longitudinal dimension of said slot.

An end of the bar 209 extends through the slot 206 in the rod 166 and is slidably supported by an abutment 210 formed on the upper casting 85 of the case enclosing the transmission unit 78 and the upper surface of the arm 169 projecting from and forming a part of said upper casting 85. Adjacent the end of the bar 209 extending through the slot 206 in rod 166 is formed an inclined surface 211 which terminates at one end thereof in a shoulder 212 and at the other end in a cupped depression 213. The bar 209 is disposed in the slot 206 in such fashion that the roller 207 will register with the inclined surface 211.

Near the left-hand end of the bar 209 as seen in Figure 9 are formed the slots 214 and 215 which are horizontally disposed and arranged in slightly offset relation so as to be joined by the vertical slot 216 at their adjacent ends. The plunger 217 of a solenoid 218 is attached to the bar 209 by means of a suitable slotted and pinned connection embodying the pin 219 which is adapted to engage one or the other of the slots 214 and 215 in the course of the operation of the control mechanism.

Adjacent the shoulder 212 on the end of the bar 209 is formed a vertically extending projection 220 which registers with an aperture in the plate 221 of an over-center toggle assembly 222 being retained therein as by means of a cotter 223 inserted in a hole 224 in said projection 220 (see Figure 14). The toggle 222 which comprises plates 221 and 225 which are secured to each other in pivotal relation about a rivet 226 is supported from the spider 34 as by means of a post 227 to which the plate 225 is secured as by means of a bolt 228.

A spring 229 attached at the ends thereof to a pin 230 on the plate 221 and a like pin 231 on the plate 225 tends to cause the plates 221 and 225 to be retained in opened position as indicated in full lines in Figure 12. A similar spring 232 which is disposed on the underside of the toggle assembly 222 is secured at one end to the pin 230 mounted on the plate 221 and at the other end thereof the projecting end of the pin 227 coacts with spring 229. A bent-up portion or stop 233 is provided upon the plate 221 and a similar stop 234 comprising a portion of the plate 225 bent downwardly cooperate to prevent said plates 221 and 225 of the toggle assembly 222 from moving beyond a completely closed position as indicated in the dotted lines M in Figure 12 of the drawings. Thus, the movements of the bar 209 are cushioned by the spring resistance of the toggle assembly 222.

With the parts in their relative positions as illustrated in Figure 9 of the drawings, the member 157 (see Figure 10) is disposed in its lowermost position with the flange member 142 associated therewith contacting the pulley 79 in driving relation so as to actuate the hollow shaft 48 and rotate the basket 55 of the extractor unit. The plunger 217 of the solenoid 218 is in retracted position and the pin 219 therein is disposed in the slot 215 of the bar 209 being caused to move from one extremity thereof to the other as the mounting 188 is oscillated by the operation of the pin 107. The control circuit of the automatic washing machine at the proper interval of the operating cycle thereof will cause the solenoid 218 to be deenergized thereby releasing the plunger 189 so that when the pin 219 in traversing the slot 215 in the bar 209 reaches the vertically extending slot 216, it will permit the plunger 217 to drop downwardly to the dotted line position N and the pin 219 will thereafter be disposed in the slot 214.

Since the mounting 188 at this point in the operation of the control mechanism occupies the position substantially as shown in dotted lines and indicated by reference character A in Figure 6 of the drawings, it will tend to move toward the opposite extremity of its oscillatory cycle indicated by the dotted line position B and, in so doing, the pin 219 which is at the extreme right-hand end of the slot 214 causes the bar 209 to move to the right as seen in Figure 9 until said bar 209 occupies the dotted line position designated by the reference character J. At this point, the mounting 188 carrying the solenoid 208 will occupy substantially the position shown in dotted lines and indicated by the reference character H with the exception that the pin 219 will be disposed in the lowermost slot 214 of the bar 209 and thereafter during the reciprocation of the mounting 188 will move from one end to the other of the slot 214 while the bar 209 remains in its advanced position.

With the movement of the bar 209 to the right, the roller 207 which at the beginning of the operation occupied a position adjacent the shoulder 212 of said bar will be caused to move along the inclined surface 211 being disposed finally in the cupped depression 213 at the uppermost end of the inclined surface 211 when the bar 209 occupies the dotted line position J. The movement of the roller 207 along the inclined surface 211 causes the vertically extending rod 166 to be moved in an axial direction upward in the bushings 167 and 168 in which it is slidably mounted until it occupies the dotted line position K and causes the member 157 to be disposed in the dotted line position L in Figure 10 of the drawings. This operation, as we have seen from the previous description of the driving mechanism associated with the extractor unit, will cause the flange member 142 to break driving contact with the pulley 79 and to bring the braking surfaces 151 and 175 into contact with disk 172 and surface 235, respectively, associated with the apparatus to stop the rotation of the hollow shaft 48 and the basket 55 mounted thereon.

With the movement of the bar 209 to the right as indicated in Figure 9, it will be understood that the slots 214 and 215 will thereafter occupy substantially the position shown in dotted lines and the pin 219 will be moved lengthwise of the slot 214 as the mounting 188 is oscillated. The movement of the arm 209 also actuates the over-center toggle assembly 222, so that the plates 221 and 225 are snapped together in closed position as indicated by the dotted line position designated by the reference character M bringing the stops 233 and 234 into contact with plates 225 and 221, respectively, against the combined action of the springs 229 and 232.

When the drying cycle in the operation of the automatic washing machine is completed, the control circuit will again cause the solenoid 218 to be energized thereby retracting the plunger 217 when the pin 219 thereof in its reciprocation reaches the end of the slot 214 at which is disposed the vertically extending slot 216. The pin 219 will, thereafter, be positioned in the slot 215 and at the left-hand extremity thereof in a position corresponding to the dotted line position H shown in Figure 9. When the mounting 188 in its oscillation moves toward the position shown in full lines, the pin 219 disposed at the end of the slot 215 in the bar 209 will cause said bar to be moved to the left. As a result of this operation, all of the several parts of the control mechanism and the extractor drive mechanism will again assume the position indicated in full lines in Figures 9 and 10 in which they were disposed at the beginning of operation.

The above described electro-mechanical control mechanism has been found to be a particularly reliable, efficient and economical control for a domestic laundry machine. The actual power for the clutching and declutching of the agitator and extractor from their respective drives is effected through power derived from the main motor directly through the transmission unit. The control current and the size of the control apparatus is small yet positive in operation.

While we have shown a particular embodiment of our invention, it will, of course, be understood that we do not wish to be limited thereto, since many modifications may be made, and we, therefore, contemplate by the appended claims to cover all such modifications that fall within the true spirit and scope of our invention.

We claim as our invention:

1. A control mechanism comprising a pivotally mounted actuating means, means for oscillating said actuating means about its pivotal mounting, a connecting means arranged to be moved in a direction corresponding substantially to its longitudinal dimension, means carried by said actuating means and oscillatably driven thereby and selectively movable into position to shift the position of said connecting means in either direction by oscillatable movement thereof, a member to be controlled, and means connected between said connecting means and said member to be controlled to operate the latter from the movement of the connecting means.

2. A control mechanism comprising a rod mounted to pivot about its axis, a support secured to said rod, means for oscillating said rod, an arm arranged to be moved in a direction corresponding substantially to its longitudinal axis, means mounted upon said support for selectively shifting the position of said arm, a member to be controlled, means cooperating with said arm and said member to be controlled to operate the latter from the movement of the arm, and means for operating said shifting means.

3. A control mechanism comprising a pivotally mounted actuating means, means for oscillating said actuating means about its pivotal mounting, a connecting means arranged to be moved in a direction corresponding substantially to its longitudinal dimension, means carried by said actuating means and oscillatably driven thereby and selectively movable in position for the position of said connecting means by oscillatable movement thereof, a member to be controlled, means connected between said connecting means and said member to be controlled to operate the latter from the movement of the connecting means, and means for cushioning the movement of the connecting means.

4. A control mechanism comprising a rod mounted to pivot about its axis, a support secured to said rod, means for oscillating said rod, an arm arranged to be moved in a direction corresponding substantially to its longitudinal axis, means mounted upon said support for selectively shifting the position of said arm, a member to be controlled, means cooperating with said arm and said member to be controlled to operate the latter from the movement of the arm, means for operating said shifting means, and means associated with said arm for cushioning the movement thereof when said arm is actuated by said shifting means.

5. A control mechanism comprising a pivotally mounted actuating means, means for oscillating said actuating means about its pivotal mounting, a connecting means arranged to be moved in a direction corresponding substantially to its longitudinal dimension, mechanical means associated with said actuating means for selectively shifting the position of said connecting means, a member to be controlled, means operatively disposed between said connecting means and said member to be controlled to operate the latter from the movement of the connecting means, and electrical means for operating said mechanical means.

6. A control mechanism comprising a pivotally mounted actuating means, means for continuously oscillating said actuating means about its pivotal mounting, a plurality of connecting means each of which is arranged to be moved in a direction corresponding substantially to its longitudinal dimension, means associated with said continuously reciprocating actuating means for selectively shifting the position of said connecting means between two fixed positions, a plurality of member to be controlled, means associated with said connecting means and said members to be controlled to operate the latter from the movement of the connecting means, and means for cushioning the movement of at least one of the connecting means.

7. In a washing machine or the like embodying a transmission, a plurality of members to be driven from said transmission and clutch means associated with said transmission for engaging and disengaging said members to be driven, a control mechanism comprising actuating means pivotally mounted on the transmission for oscillation about its mounting, a plurality of connecting means supported by said transmission in substantially axially slidable relation, means associated with said actuating means for selectively shifting the positions of said connecting means, and means independently cooperating with each of said connecting means to engage and disengage the clutch means for starting and stopping the members to be driven.

8. In a washing machine or the like embodying a transmission, a plurality of members to be driven from said transmission and clutch means associated with said transmission for engaging and disengaging said members to be driven, a control mechanism comprising actuating means pivotally mounted on the transmission for oscillation about its mounting, a plurality of connecting means supported by said transmission in substantially axially slidable relation, mechanical means associated with said actuating means for selectively shifting the positions of said connecting means, means independently cooperating with each of said connecting means to engage and disengage the clutch means for starting and stopping the members to be driven, and electrically operated means for actuating said mechanical shifting means.

9. In a washing machine or the like having a drive member, a motor for driving said drive member, a driven member, and a clutch selectively coupling said drive member to be driven from said drive member, an operating means for said clutch including an oscillating control member adapted to be continuously oscillated by said motor, an actuating arm mounted for limited lengthwise movement between two fixed positions and actuated by said control member, said actuating arm having two spaced abutments and being effective in one position to engage the clutch to connect said drive member to said driven member and in its other position to disconnect said drive member from said driven member, and clutch means on said continuously oscillated control member having slideable engagement with said actuating arm and movable into position to abuttingly engage either of said abutments on said arm, to move said arm in either direction from one of its positions to another.

10. In a washing machine or the like embodying a transmission having a drive member, a driven member and a clutch member selectively operable to couple said driven member to be driven from said drive member, operating means for said clutch including an oscillating control member adapted to be connected to said transmission and continuously oscillated thereby, an actuating arm mounted for limited lengthwise movement between two fixed positions having two longitudinally spaced abutments and being effective, said actuating arm in one position to operate said clutch to connect said drive member to said driven member and in its other position to operate the clutch to disconnect said drive member from said driven member, and clutch means on the end of said continuously oscillating control member including a member normally having slideable engagement with said actuating arm during oscillation of said continuously oscillating control member and movable into position to have abutting engagement with either of said abutments on said arm and to move said arm in either direction from one of its positions to another.

11. In a washing machine or the like embodying a transmission unit having a drive member, a driven member, and a clutch member selectively operable to couple said driven member to be driven from said drive member, the improvement which comprises operating means for said clutch including an oscillating control member continuously oscillated by the transmission unit, an actuating arm mounted for limited lengthwise movement between two fixed positions and having two spaced abutments, said actuating arm in one position being effective to actuate said clutch to connect said drive member to said driven member and in its other position to actuate said clutch to disconnect said drive member from said driven member, and clutch means on said continuously oscillated control member including an abutment member normally having slidable engagement with said actuating arm and means moving said member into position to have abutting engagement with either of said spaced abutments on said arm to move it from one of its positions to another by striking engagement therewith.

12. In a washing machine or the like embodying a transmission having a motor serving as a prime mover therefor, two driven members and a first and second clutch mechanism selectively operable to connect said driven members to be driven by said motor, the improvement which comprises operating mechanism for said clutch mechanisms including an oscillating control member adapted to be mounted intermediate its ends on said transmission unit and continuously oscillated by said transmission unit, a first control arm movable lengthwise between two fixed positions and connected to said first clutch mechanism to actuate said clutch, a second control arm movable lengthwise between two fixed positions and connected to said second clutch mechanism to actuate the same, a first clutch means adjacent one end of said oscillating control member for selectively engaging during a half cycle of oscillation of said oscillating control member, one of said control arms, to move said control arm to a different one of its two positions, and a second clutch means adjacent the other end of said oscillating control member for selectively engaging the other of said control arms during another half cycle of oscillation of said oscillating control member to move said other control arm to a different one of its two positions.

13. In a washing machine or the like, a motor serving as a prime mover therefor and a drive member driven by said motor, a driven member and a clutch selectively operable to couple said driven member to be driven by said drive member, operating means for said clutch including a control member adapted to be oscillated by said motor, and actuating bar mounted for limited lengthwise movement, said bar having a slot therein including a pair of slot portions spaced laterally as well as lengthwise of each other and a third slot portion connecting the adjacent ends of said slot portions together, a solenoid mounted on said continuously oscillating control member including an armature having a pin extending into said slot, each of said first two slot portions having a length at least equal to the arc of travel of said solenoid on said continuously oscillating member whereby said pin oscillates back and forth in either said first slot portion or said second slot portion depending upon the position of said armature, said bar being shifted during one of the halves of the first complete oscillation of said control member whenever said armature is moved so as to change said pin from one of said slot portions to the other, said actuating bar in one position being effective to actuate said clutch to connect said drive member to said driven member and in its other position to disconnect said drive member from said driven member.

14. In a washing machine or the like embodying a transmission unit, a drive member driven thereby, a driven member and a clutch selectively operable to connect said drive member to be driven by said driven member, the improvement which comprises a control member connected to said transmission and continuously oscillated thereby, an actuating bar mounted for limited lengthwise movement, said bar having a slot therein including a pair of slot portions spaced laterally as well as lengthwise of each other, and a third slot portion extending between the adjacent ends of said first two slot portions, a solenoid mounted on said continuously oscillating control member and including an armature having a pin extending into one of said slot portions, and movable laterally along said third slot portion upon energization or deenergization of said solenoid into either one of said first mentioned slot portions, each of said first two slot portions having a length at least equal to the arc of travel of said armature on said continuously oscillating member, whereby said pin oscillates back and forth in either of said first slot portion or said second slot portion depending upon the position of said armature, said bar being shifted during one of the halves of the first complete oscillation of said control member whenever said armature is moved to change said pin from one of said pairs of slot portions to the other, said actuating bar in one position being effective to actuate said clutch to connect said drive member to said driven member and in its other position to disconnect said drive member from said driven member.

PETER EDUARD GELDHOF.
LUTHER RINGER.

REFERENCES CITED

The following references are of record in the file of this patent:

UNITED STATES PATENTS

| Number | Name | Date |
|---|---|---|
| 377,413 | Smith | Feb. 7, 1888 |
| 428,376 | Brown | May 20, 1890 |
| 1,892,441 | Wales et al. | Dec. 27, 1932 |
| 1,982,925 | Quinn | Dec. 4, 1934 |
| 2,150,014 | Walter | Mar. 7, 1939 |
| 2,177,052 | Blough | Oct. 25, 1939 |
| 2,267,415 | Myers | Dec. 23, 1941 |
| 2,280,047 | Nampa | Apr. 14, 1942 |
| 2,300,187 | Wemp | Oct. 27, 1942 |
| 2,325,102 | Boschen | July 27, 1943 |
| 2,357,775 | Tyzzer | Sept. 5, 1944 |
| 2,361,767 | Hays | Oct. 31, 1944 |
| 2,368,987 | Henschker | Feb. 6, 1945 |
| 2,388,407 | Hansen | Nov. 6, 1945 |